US012521633B2

(12) United States Patent
Eapen

(10) Patent No.: US 12,521,633 B2
(45) Date of Patent: Jan. 13, 2026

(54) DYNAMIC SOUNDTRACK GENERATION IN ELECTRONIC GAMES

(71) Applicant: Arvid Eapen, Plainsboro, NJ (US)

(72) Inventor: Arvid Eapen, Plainsboro, NJ (US)

( * ) Notice: Subject to any disclaimer, the term of this patent is extended or adjusted under 35 U.S.C. 154(b) by 235 days.

(21) Appl. No.: 18/414,459

(22) Filed: Jan. 16, 2024

(65) Prior Publication Data

US 2025/0229184 A1 Jul. 17, 2025

(51) Int. Cl.

| | |
|---|---|
| ***A63F 13/67*** | (2014.01) |
| ***A63F 13/54*** | (2014.01) |
| ***A63F 13/60*** | (2014.01) |
| ***A63F 13/814*** | (2014.01) |
| *G10H 1/00* | (2006.01) |

(52) U.S. Cl.

CPC .............. *A63F 13/67* (2014.09); *A63F 13/54* (2014.09); *A63F 13/60* (2014.09); *A63F 13/814* (2014.09); *A63F 2300/6009* (2013.01); *A63F 2300/6027* (2013.01); *A63F 2300/6063* (2013.01); *A63F 2300/6081* (2013.01); *G10H 1/0025* (2013.01); *G10H 2210/026* (2013.01); *G10H 2250/311* (2013.01)

(58) Field of Classification Search

CPC .......... A63F 13/67; A63F 13/54; A63F 13/60; A63F 13/814; A63F 2300/6063; A63F 2300/6081; A63F 2300/6009; A63F 2300/6027; G10H 2210/026; G10H 2210/125; G10H 2210/555; G10H 2210/561; G10H 1/0025; G10H 2250/311

See application file for complete search history.

(56) References Cited

U.S. PATENT DOCUMENTS

| | | | | |
|---|---|---|---|---|
| 7,674,966 | B1 * | 3/2010 | Pierce | G10H 1/0025 84/610 |
| 10,888,783 | B2 * | 1/2021 | Taylor | A63F 13/67 |
| 10,964,299 | B1 * | 3/2021 | Estes | G10H 1/0025 |
| 11,024,275 | B2 * | 6/2021 | Estes | G10H 1/0066 |
| 11,024,276 | B1 * | 6/2021 | Dabby | G10H 1/0025 |
| 11,037,538 | B2 * | 6/2021 | Estes | G10H 1/38 |
| 11,508,345 | B1 * | 11/2022 | McLafferty | A63F 13/79 |
| 11,638,873 | B2 * | 5/2023 | Taylor | A63F 13/60 463/43 |
| 11,839,815 | B2 * | 12/2023 | Wakeland | A63F 13/54 |
| 12,128,308 | B2 * | 10/2024 | McCoy | A63F 13/285 |

(Continued)

*Primary Examiner* — William H McCulloch, Jr.

(74) *Attorney, Agent, or Firm* — Weitzman Law Offices, LLC

(57) ABSTRACT

A system for performing a computer-implemented method of dynamically generating a soundtrack during a human play of an electronic game is disclosed. The method begins by receiving an association between an input- or gameplay-related trigger and a dynamic restructuring of a stem with a one-shot to be performed when the trigger occurs. During gameplay player inputs or game state changes are stored in a queue and fetched from the queue. When it is determined that the trigger has occurred, the stem and the one-shot are fetched and one or more compatibility tests are performed, including parametric equalization. A modified stem is generated that incorporates the one-shot into the stem, and an audio output device associated with a computing device outputs the modified stem as part of a soundtrack accompanying gameplay.

20 Claims, 6 Drawing Sheets

(56) References Cited

U.S. PATENT DOCUMENTS

| | | | | |
|---|---|---|---|---|
| 12,251,634 | B2 * | 3/2025 | Taylor | A63F 13/54 |
| 2019/0083886 | A1 * | 3/2019 | Taylor | A63F 13/54 |
| 2020/0188790 | A1 * | 6/2020 | Galuten | A63F 13/212 |
| 2020/0306641 | A1 * | 10/2020 | Kolen | G06F 16/635 |
| 2020/0312287 | A1 * | 10/2020 | Galuten | G10H 1/0025 |
| 2021/0110800 | A1 * | 4/2021 | Estes | G10H 1/0025 |
| 2021/0110801 | A1 * | 4/2021 | Estes | G10H 7/008 |
| 2021/0110802 | A1 * | 4/2021 | Estes | G10H 1/0025 |
| 2021/0129025 | A1 * | 5/2021 | Taylor | A63F 13/54 |
| 2022/0180882 | A1 * | 6/2022 | Wang | G06N 3/088 |
| 2022/0193549 | A1 * | 6/2022 | Wakeland | A63F 13/79 |
| 2023/0186884 | A1 * | 6/2023 | Koretzky | G10H 1/0066<br>84/611 |
| 2023/0368759 | A1 * | 11/2023 | Johnson | G10H 1/361 |
| 2024/0024776 | A1 * | 1/2024 | McCoy | A63F 13/285 |
| 2025/0191558 | A1 * | 6/2025 | Silverstein | G06Q 50/184 |
| 2025/0229184 | A1 * | 7/2025 | Eapen | A63F 13/54 |
| 2025/0285605 | A1 * | 9/2025 | Kuhn | G10H 1/0025 |

* cited by examiner

DYNAMIC SOUNDTRACK GENERATION IN ELECTRONIC GAMES

FIELD OF INVENTION

This application relates to software systems for rendering audio as part of a video game soundtrack, and more specifically to an automated system that dynamically restructures the stems of a musical composition to synchronize music with in-game events whether those events are initiated by the player or by the game itself.

BACKGROUND

Soundtracks are an indispensable facet of modern video games. These soundtracks contribute to developing an atmosphere, providing important feedback to players, and generally improving the gameplay experience. An important consideration when composing an effective video game soundtrack is deciding how the soundtrack will respond to changes in the game state or player inputs. At a basic level, one track of music that was playing during gameplay should generally be stopped and transitioned to a new track when a level is completed or a cutscene begins, but much more subtle changes to the soundtrack may be desirable to make a more responsive and immersive soundscape.

However, it is impossible to compose a soundtrack in advance that matches many aspects of gameplay. Even if the behavior of environmental aspects and non-player characters were standardized—and they aren't, due to interactivity, randomness, or unpredictable AI behaviors—user input would always be a variable that could not be fully controlled. No two playthroughs of a game will ever be identical.

Developers can provide for more flexibility by splitting soundtrack compositions into their individual instruments' tracks. These are called "stems." Through the use of software, these stems are linked to certain parameters and these parameters determine when the stems are played for the user. While this does allow for some increased flexibility, such as allowing for an "underwater" version of a level's track, or other variations based on the player's location or similar parameters, there is still a limit to how closely the stems can match the gameplay because of their pre-written, static nature. As a result, video game soundtracks have been unable to achieve a level of synchronicity comparable to that of a cinematic or television experience.

SUMMARY OF THE INVENTION

This invention aims to achieve movie level soundtrack integration through the manipulation of stems. Instead of using static stems to make up the soundtrack, the proposed software will be able to use the building blocks of stems (referred to as one-shots) to dynamically restructure stems based on user input and game events. The user would begin by importing both the stem of the track, and the associated one shot that the stem was created with. The user can then link these one-shots to their desired parameters (i.e., firing a weapon, opening a door, moving). This process would then be repeated as desired for all the stems that create the track. The software will then use a variety of metrics measured during the gameplay to determine how best to implement the one-shot placement based on the developer parameters.

A system for performing a computer-implemented method of dynamically generating a soundtrack during a human play of an electronic game is disclosed. The method begins by receiving an association between an input- or gameplay-related trigger and a dynamic restructuring of a stem with a one-shot to be performed when the trigger occurs. During gameplay player inputs or game state changes are stored in a queue and fetched from the queue. When it is determined that the trigger has occurred, the stem and the one-shot are fetched and one or more compatibility tests are performed, including parametric equalization. A modified stem is generated that incorporates the one-shot into the stem, and an audio output device associated with a computing device outputs the modified stem as part of a soundtrack accompanying gameplay.

In particular variations of the system, additional tests may be performed to confirm that the insertion will be on-tempo and on-key, and to modify timing of insertion, tempo, and key as necessary, or to silence other stems that would clash or not contribute to a gameplay experience.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION OF THE DRAWINGS

In order to solve the aforementioned problems presented by the variability of game events, a fully automated system is disclosed herein to receive track stems, one-shots, and a variety of parameters from a developer. During runtime, the system will use a variety of metrics that can be derived from either the player or the developer, in combination with the parameters that the developer previously provided, to restructure the stems and create a unique version of a soundtrack customized to a single instance of the player's gameplay.

Figure 1:
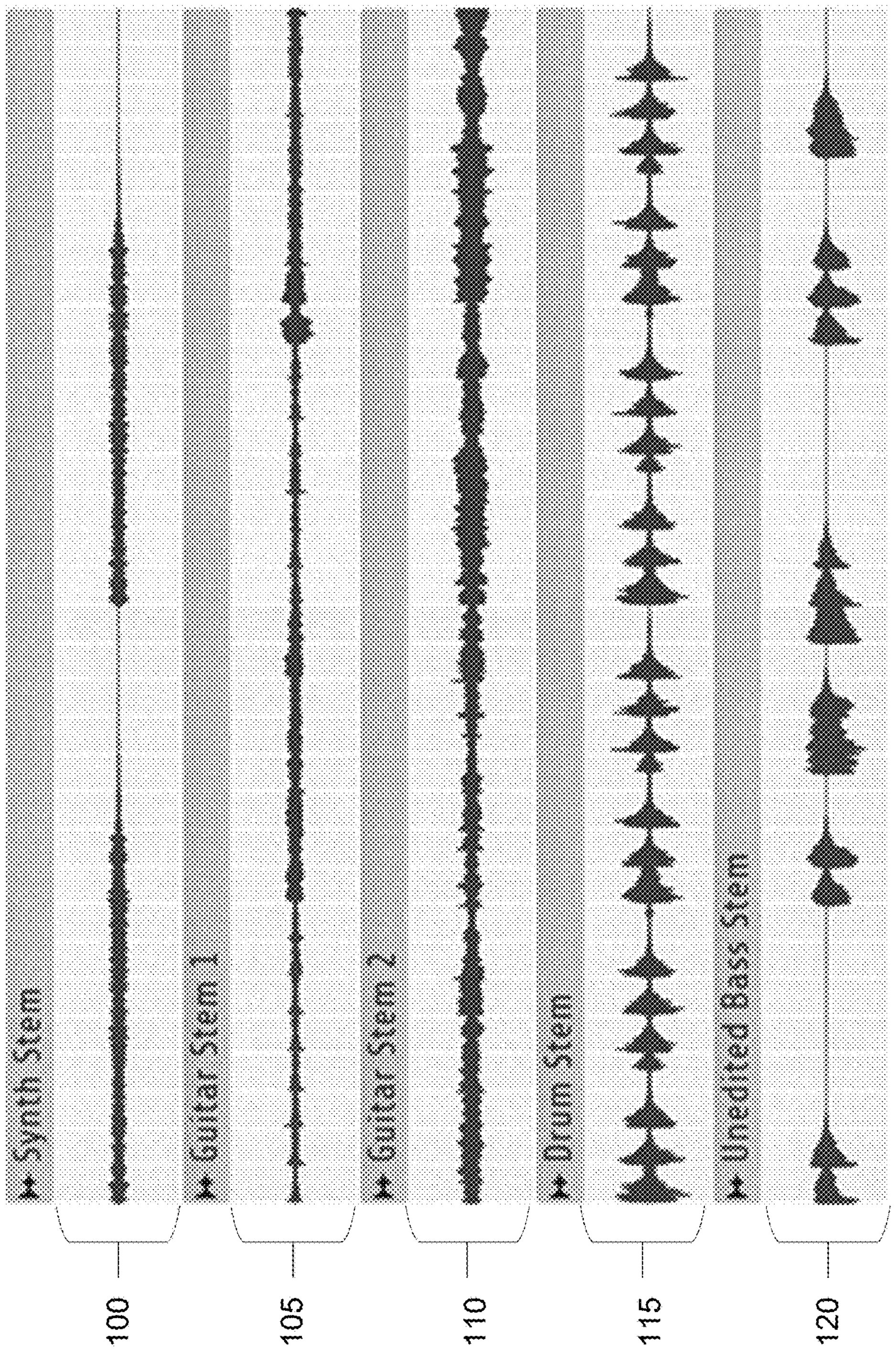
FIG. 1 depicts the waveforms of five stems, each representing different musical instruments, arranged to create a section of a track in the greater composition.
Figure 2:
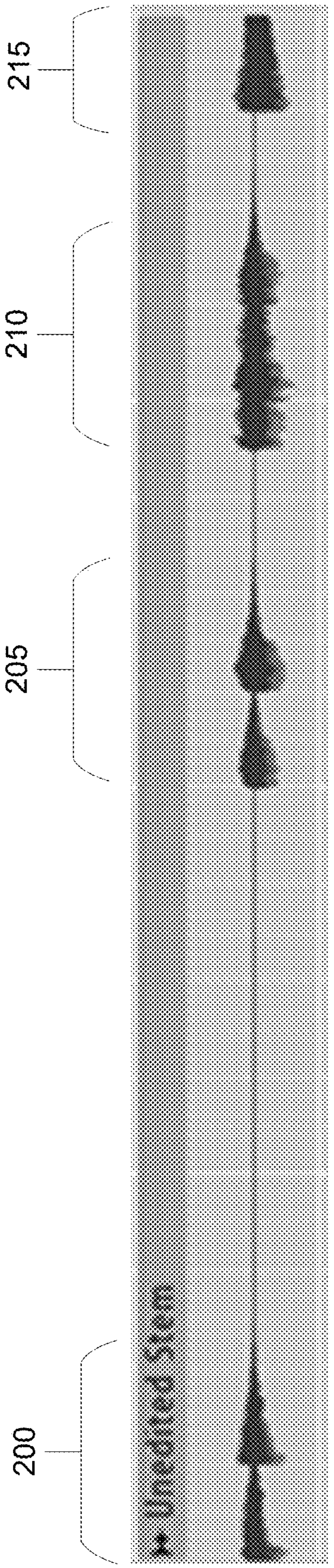
FIG. 2 depicts the waveform of a single stem selected from FIG. 1.
Figure 3:
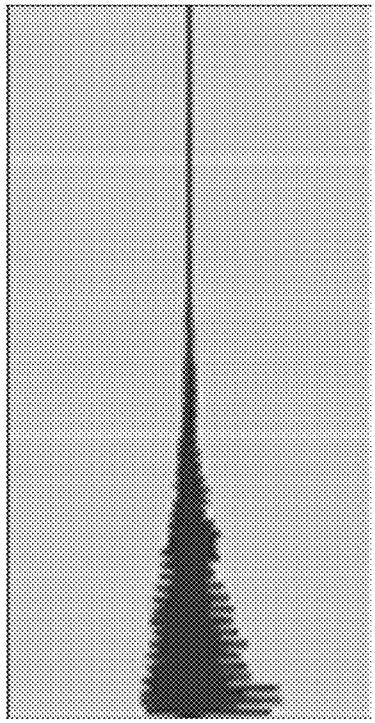
FIG. 3 depicts the waveform of a singular synth bass note one-shot that was used to create the stem depicted in FIG. 2.

FIG. 1 shows a section of a track split into multiple stems 100, 105, 110, 115, 120. These stems are each labeled by the instrument that has been recorded or that a synthesized sound represents. In this example, a composer or game designer may be interested in dynamically editing the "bass stem" 120 in order to add one or more one-shot bass notes to the prerecorded track. FIG. 2 depicts a portion of the bass stem 120 separated from the other stems, and FIG. 3 depicts the one-shot bass note 300 that is intended for dynamic incorporation into the bass stem 120. As depicted in FIGS. 1 and 2, the bass stem 120 has four relevant periods where bass notes are being played: an initial two beats 200, latter two beats 205, a more sustained first sound or riff 210, and a second sustained sound 215 at the end of the stem.

In a preferred implementation, the composer or game designer will provide to an automated system the Waveform Audio File (.wav) for both the bass stem 120 and the one-shot 300, as well as the tempo at which the stem is to be played, expressed in either a relative metric such as bpm (beats per minute) or an absolute metric, such as the number of seconds the bass stem should take to play, or a multiplier such as x1.1 speed. In alternative implementations, the composer may provide files in a lossless data format different from .wav, in a lossy data format such as .mp3, or even in a more abstract audio forma—such as Musical Instrument Digital Interface ("MIDI"/.mid) or another means of specifying future generation of a sound, such as a Fourier-transformed equivalent to a sound, a particular tone or frequency, etc.

Once composition of the base stems is complete, the composer has the ability to specify a "restructure action" that will be used to edit the stem. A graphical user interface may be supplied for depicting waveforms, allowing selection of expected inputs or game states to act as triggers, and selection of possible restructure actions to be performed, if possible, in response to those triggers. Alternatively, such triggers and responses may be provided in an existing syntax or script form, saved in a text file or similar format, so long as it is capable of parsing and interpretation by the software modules described below in greater detail.

Restructure actions may include, but are not limited to: playing additional one-shots, changing the pitch of a stem, matching the pitch of a stem to the pitch of another sound effect or track, changing the tempo of a stem, reversing a stem or one-shot, and muting the stem. Some of the actions, such as pitch and tempo modulation, may require additional information from the composer to specify exactly what modulation will be performed. Others, such as reversing or muting, may occur based on only the command itself, without additional parameters being supplied.

Once the restructure action has been selected, the composer will select one or more parameters that will be associated with the action and that must be occur in order to trigger the action to occur. These parameters include, but are not limited to: user input (key tracking, mouse tracking, the status of other peripheral input devices), player character behavior (whether the player's character has sustained movement, has engaged in sustained weapon fire, has a period inaction, has entered a particular area, has picked up an item, has interacted with a non-player character, etc.), and non-player character behavior or environmental changes (movement of AI characters, AI characters' use of items or weapons, other events in the game environment). Once the requirements or triggers to edit the stem have been specified, a system can render audio according to the specification at runtime. During gameplay, the system will dynamically generate audio by using a set of modules depicted in FIG. 6 and discussed further below.

To ensure that the edits made to the stem are in tempo, in key, and do not feature overlapping frequencies, the system will preferably run multiple compatibility tests before any changes are made and output as part of the game soundtrack. These tests can be toggled on and off by the composer if they are not relevant to the stem, or if they would interfere with a desired experience during gameplay, such as having deliberately discordant music, deliberately overlapping sounds to create a chaotic effect, and so on.

Figure 4:
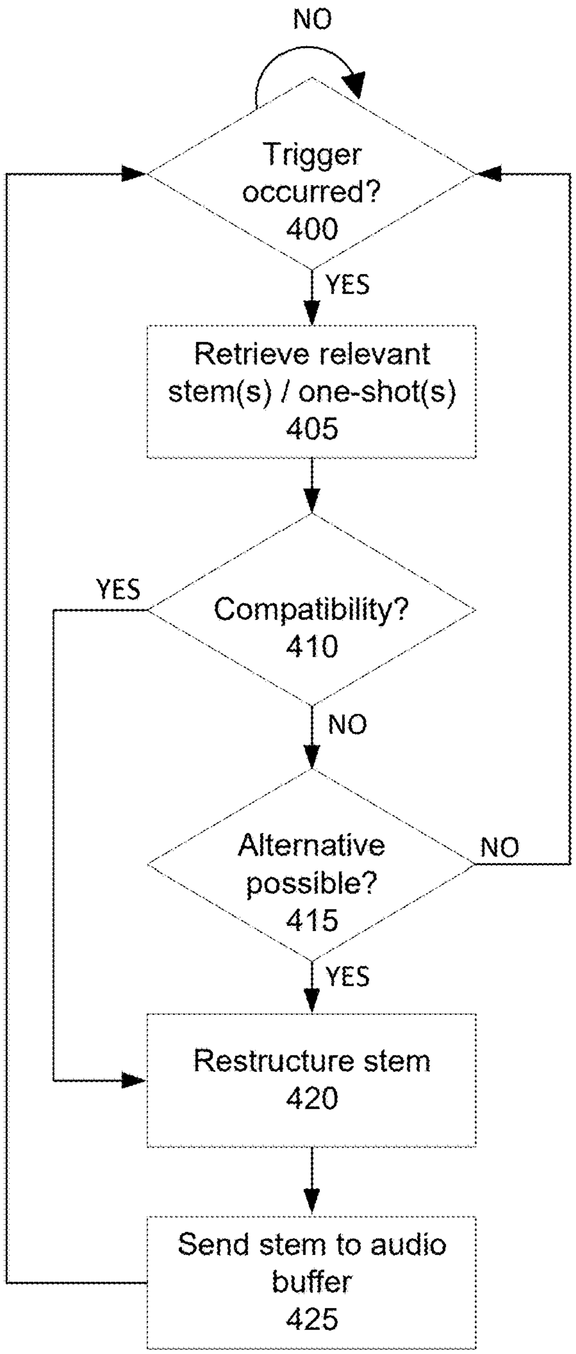
FIG. 4 depicts, in simplified form, a flow chart that shows the steps a system embodying the teachings disclosed herein would take to dynamically implement a change specified by a human composer or game designer.

FIG. 4 depicts, in simplified form, a flow chart that shows the steps a system would take to dynamically implement a change specified by a human composer or game designer.

When a previously defined trigger for a restructure action occurs (Step 400), the stem(s) and one-shot(s) are retrieved from an audio library (Step 405) and at least one of multiple tests described above and below are performed (Step 410).

There are three primary compatibility tests that would be run in a preferred implementation, such that a failure in any of the tests will causing a different corresponding response and affect the audio output of the system differently.

A first compatibility test is an overlapping frequencies test. A parametric equalizer is used to determine whether a proposed change to the stem will result in clashing frequencies, which can make the resulting track sound muddy and crowded. If this test is failed, one of two fallback options can be selected: (1) the restructure action will not occur when triggered; or (2) the parametric equalizer filters out clashing frequencies to allow the change to be made to the fullest extent possible without creating a clash.

A second compatibility test is a quantization test. If a note is quantized, it is aligned in time with the beat of a song or other pattern. The quantization test determines whether a new one-shot insertion would be on-beat with the rest of the stem, based on the tempo information that was preferably provided by the composer or determined when the stem was originally provided. The system will have an internal metronome that keeps track of the stem, and this metronome will modulate its pace if a restructure action changes the tempo of the stem. If this test is failed, one of two fallback options can be selected: (1) the restructure action will not occur when triggered; or (2) the one-shot insertion will be postponed until the next available moment in time when the insertion would be on-beat without failing the other tests.

A third compatibility test is a pitch test. If the restructure action involves changing the pitch of a stem, this test will use a key detection algorithm to determine if the new pitch is in tune with the other stems that are playing at the same time. If this test fails, there are at least three possible responses.

A first option is changing the pitch of the other stems to maintain tonality. Because this operation can be very computationally expensive and tax the most processors, it is unlikely to be completed before the audio will need to be fed to the buffer for audio output. Nevertheless, it is an option if the processing power of the computer providing the electronic game is sufficient, or if a stem is going to be delayed anyway as a result of the second test.

A second action is muting one or more stems that are not in key with the restructured stem (and retaining one or more stems if they are in key with the restructured stem).

A third option would be that the restructure action will not occur when triggered.

If the compatibility tests are passed without a need for modification, or if the system is able to filter, delay, and/or remodulate stems and one-shots to pass the tests (Step 415), the system will make the desired modification to the stem (Step 420), feed it to the audio buffer (Step 425), and it will be heard imminently during gameplay. If the tests are not passed, and cannot be passed before a predetermined threshold of time has been reached, the change will not be made. This process repeats each time one of the triggers specified by the composer/game designer is fulfilled, and otherwise, the dynamic audio system returns to waiting for a suitable trigger (back to Step 400, and repeating Step 400).

Figure 5:
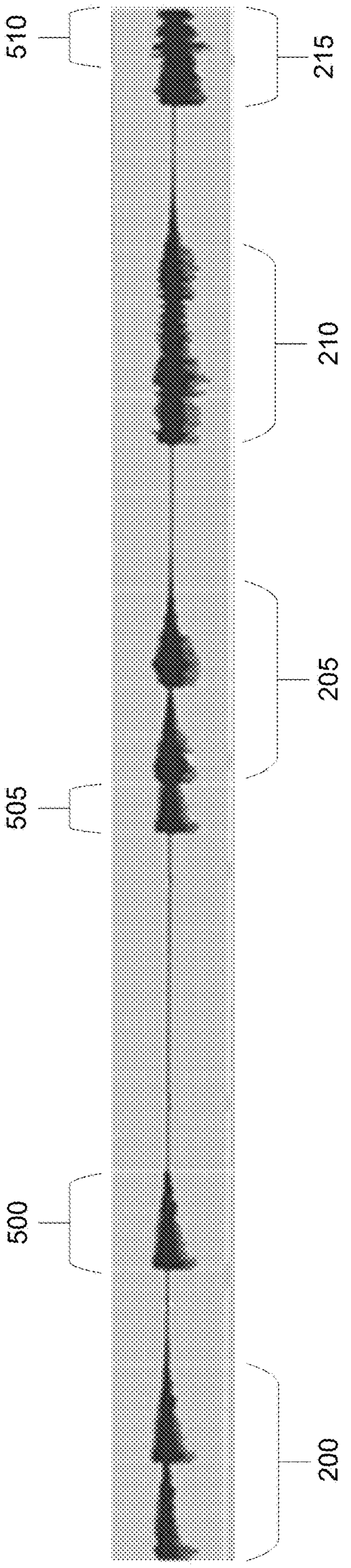
FIG. 5 depicts the waveform originally depicted in FIG. 2 after a dynamic renderer has been used to modify the audio output by incorporating additional instances of the one-shots from FIG. 3 into the original stem, creating a new stem that follows the same sonic theme as the original stem, but matches the flow of the gameplay more closely.

To illustrate the outcome of this process, FIG. 5 shows a potential modification to the example waveform of FIG. 2 after the compatibility tests have been passed. Additional regions 500, 505, 510 represent new one-shots that have been incorporated into the original stem.

The first one-shot 500 can be added to the stem after the initial beats 200 where there is no audio in the stem, and thus the first test, interference, is satisfied. The second test is satisfied by ensuring that it is aligned with the beat; as may be visible in FIG. 5, if the initial beats 200 are interpreted as being one "unit" long, each, there is exactly one more unit of silence or "dead air" before the new one-shot 500 is inserted, so the one-shot will appear to be in rhythm with those initial beats. The third test may be satisfied by either assuring in advance that the one-shot is of the same key as the stem, or by shifting one or the other as necessary.

The second one-shot 505 is added exactly half of a unit before the next set of beats 205, such that it likewise will not present a problem on the second test, nor on the third test if its key has been selected appropriately. However, now that it overlaps with the existing audio of the stem instead of being inserted into a period of total silence, parametric equalization may be needed to ensure that the overlapping period of sound is not cacophonous.

Finally, another one-shot 510 is inserted in the midst of the final portion or riff 215. Again, the one-shot begins a half-unit after the final portion has begun, ensuring that the beat is kept. Depending on how chaotic the parametric equalization test turns out, it may be preferable to omit the one-shot 510 rather than attempt to play it at a "busy" region of the stem.

Technical Overview

Figure 6:
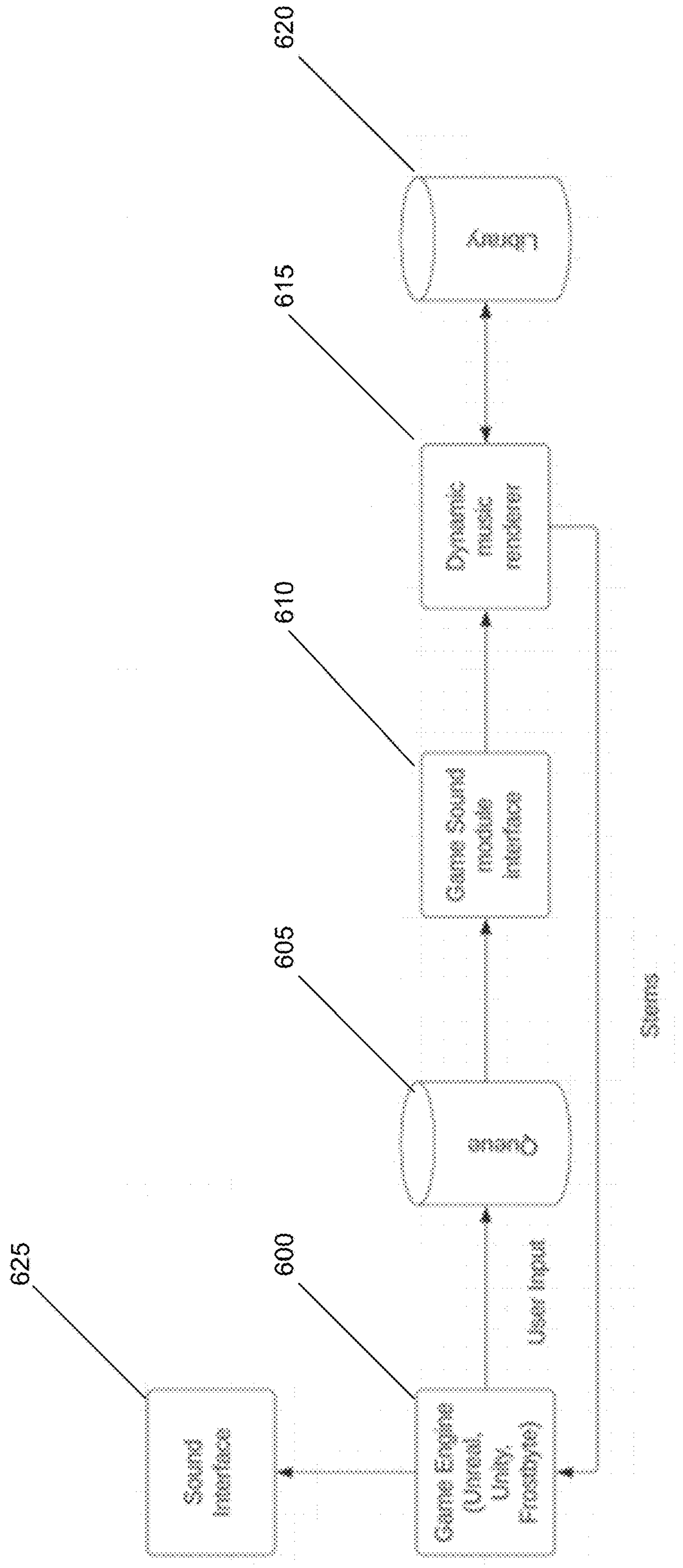
FIG. 6 depicts a simplified, high-level overview of the software modules that communicate with one another in order to accomplish the dynamic generation of a soundtrack at runtime.

At a high level of generality, a core mechanic in preferred implementations of the system is the use of while loops or other similar language structures to perform periodic checks of an event queue or other data structure to see whether one or more of the user defined triggers has occurred and, if so, implement restructure actions. In a preferred implementation, the system would use a binary search tree data structure to store and access information. This type of data structure is optimal because of its ability to store frequently occurring values, which would allow for recognized patterns within the system to be stored and deployed with less processor strain. Binary search trees are also commonly used by artificial intelligence to make decisions and predict outcomes, which are important qualities in a dynamic generation tool. Nevertheless, in other implementations, other data structures may be used, such as hash tables, trees with non-binary topologies, FIG. 6 depicts a simplified, high-level overview of the process that takes place during runtime to edit the soundtrack.

A game engine 600 acts as the interface to a human player, receiving player input through the controller, keyboard, mouse, or other peripherals, calculating any changes to the game state based on the player input and the rules of the game, and outputting visual and audio content that correspond to the changes in the game state. The game engine 600 converts the player's input into a form that will ultimately be expected for compatibility with the dynamic music renderer module 615. In various implementations of these teachings, the game engine role may be served by commercially available software such as the Unreal engine, Unity engine, Frostbyte engine, other similar game engines, or custom-written software for a particular game rather than a game-agnostic engine made to facilitate any number of different games.

Within the game engine 600, user inputs are mapped to certain actions in the game, and these inputs are also mapped to actions within the dynamic music renderer 615. Whenever a player input or game state that is potentially relevant to the dynamic music renderer 615 (because it matches at least one previously provided trigger), the game engine will push that input or state to a first in, first out queue 605. The queue 605 stores player input or game state information received from the game engine 600 in order to feed information to later modules at a manageable pace and prevent later inputs from interfering with earlier inputs. The queue might store the user input in the format of particular keystrokes or other peripheral inputs, or alternatively may receive and store information at a higher level of abstraction, such as "held weapon changed", "weapon fired", "area entered", "NPC killed", and so on. In a preferred implementation, Apache Kafka is used to facilitate the queue, though other software may be used whenever a situation calls for it.

A game sound module interface 610 constantly pulls elements from the queue 605 and uses the inputs to determine which actions are necessary to be taken by the dynamic music renderer 615. The interface will use logic to determine which stems and one-shots are affected, and what type of edits need to be made to the soundtrack (parametric equalization, pitching, tempo change, etc.). The interface will convert these instructions into a JSON file format, and pass the directions to the dynamic music renderer.

A dynamic music renderer 615 receives instructions from the game sound module interface and trigger various edits based on the information it receives. This can range from changing the pitch of a stem, to adding new one-shots into the stems and effectively changing the structure of the soundtrack. To make these edits, the renderer will communicate with a library that the composer fills with the stems and one-shots used to make the relevant piece of music. Once these edits are complete, the renderer will send the relevant stem back to the game engine to be played in the game. If the edit is not able to be made fast enough, or there are issues with quantization or these edits being "on beat", nothing will be sent to the game engine and the process will repeat with the next keystroke in the queue.

A library 620 stores the stems and one-shots that have been previously provided by the composer. The renderer 615 uses information within the JSON file to determine which stems need to be pulled from the library to be edited. This library can be filtered to only present elements from the composition that is being played at the time of the edit to reduce processing speed.

Example of Implementation in Use

Imagine, for example, that a player is playing a first-person shooter style of game. At the beginning of play, the player character is loaded into a hallway. At this time, one stem containing an atmospheric synth track would be playing. As the character begins to walk down the hallway, a kick drum one-shot might begin to play in sync with the footsteps. The tempo-matching compatibility test would alter the speed of the synth stem to match the pace of the character's footsteps. As the character gets closer to the end of the hallway, new stems begin to transition in until there are multiple drum stems and melodic stems. The introduction of these new stems signals to the player that an important encounter lies at the end of the hallway. Once the character reaches the end of the hallway, they are prompted to open a door. When the player presses the interaction button to open the door, they enter a dark room. The stems now filter out, leaving only the kick drum. This drum would again be in sync with the characters footsteps, but could also be synced to other player actions or human inputs such as mouse movement. If the player is moving frantically, the kick drum could reflect that and accelerate, creating an auditory sensation similar to an elevated heartbeat. The kick drum can thus be used to build tension until the player encounters the first enemy, at which point more stems would begin playing, to signify the beginning of a combat encounter.

During the combat encounter, the system would be able to use the developers' parameters to have the music sync to the combat. For example, if a player is using a weapon that needs to be charged up before firing, the system could filter out most of the stems playing during the moment of charging to build up suspense. The pitch-modification restructure mentioned earlier could also be used here to match the pitch of a stem to the charge up sound effect. Once the weapon is fired, the remaining stems would start playing on beat. In a similar vein, the system could match hi-hat rolls to machine gun fire, match particular stems to the use of particular vehicles, match particular stems to particular game states such as health bar or on-screen timers, and so on.

If there are abilities in the game relating to speeding up or slowing down time, the stems can also be slowed down to match the pace of the game, while still retaining their reactive properties. This can be done through the use of existing audio manipulation tools such as Gross Beat.

The descriptions of the various implementations of the teachings presently disclosed have been presented for purposes of illustration, but are not intended to be exhaustive or limited to only the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for dynamically generating a soundtrack during a human play of an electronic game, comprising:
- a music rendering module;
- a library containing at least one stem and at least one one-shot;
- non-transitory memory storing instructions that, when executed by one or more processors of a computing device comprising the music rendering module, the library, and a game engine, cause the one or more processors to:
- receive an association between an input- or gameplay-related trigger and a dynamic restructuring of a stem with a one-shot to be performed when the trigger occurs;
- pass information comprising one or more player inputs or game state changes from the game engine to a queue;
- fetch a player input or game state change from the queue;
- identify a previously received trigger that corresponds to the fetched player input or game state change;
- fetch the stem and the one-shot associated with the previously received trigger from the library;
- perform one or more tests to ensure compatibility of the stem and the one-shot at a moment where insertion of the one-shot will occur, the one or more tests including parametric equalization;
- produce a modified stem that incorporates the one-shot into the stem; and
- cause an audio output device associated with the computing device to output the modified stem as part of a soundtrack accompanying gameplay.

2. The system of claim 1, wherein the one or more tests also include testing whether the moment where insertion of the one-shot would occur is on a beat of the stem.

3. The system of claim 2, wherein, if it is determined that insertion would not occur on the beat of the stem, the one-short is inserted at a later moment that is on the beat of the stem.

4. The system of claim 1, wherein the one or more tests also include testing whether the one-shot is in a same key as the stem.

5. The system of claim 4, wherein, if it is determined that the one-shot is not in the same key as the stem, the one-shot is modulated into an appropriate key.

6. The system of claim 4, wherein, if it is determined that the one-shot is not in the same key as the stem, the stem is modulated into an appropriate key.

7. The system of claim 6, wherein one or more other stems also being played simultaneously are likewise modulated into an appropriate key.

8. The system of claim 6, wherein one or more other stems also being played simultaneously are temporarily muted to avoid playing stems in different keys simultaneously.

9. The system of claim 1, wherein the stem's tempo is also accelerated or decelerated before output.

10. The system of claim 1, wherein one or more other stems that were previously playing are silenced at the moment that the modified stem begins playing.

11. A computer-implemented method of dynamically generating a soundtrack during a human play of an electronic game, comprising:
- receiving an association between an input- or gameplay-related trigger and a dynamic restructuring of a stem with a one-shot to be performed when the trigger occurs;
- passing information comprising one or more player inputs or game state changes from a game engine to a queue;
- fetching a player input or game state change from a queue;
- identifying a previously received trigger that corresponds to the fetched player input or game state change;
- fetching the stem and the one-shot associated with the previously received trigger from a library;
- performing one or more tests to ensure compatibility of the stem and the one-shot at a moment where insertion of the one-shot will occur, the one or more tests including parametric equalization;
- producing a modified stem that incorporates the one-shot into the stem; and
- causing an audio output device associated with the computing device to output the modified stem as part of a soundtrack accompanying gameplay.

12. The method of claim 11, wherein the one or more tests also include testing whether the moment where insertion of the one-shot would occur is on a beat of the stem.

13. The method of claim 12, wherein, if it is determined that insertion would not occur on the beat of the stem, the one-short is inserted at a later moment that is on the beat of the stem.

14. The method of claim 11, wherein the one or more tests also include testing whether the one-shot is in a same key as the stem.

15. The method of claim 14, wherein, if it is determined that the one-shot is not in the same key as the stem, the one-shot is modulated into an appropriate key.

16. The method of claim 14, wherein, if it is determined that the one-shot is not in the same key as the stem, the stem is modulated into an appropriate key.

17. The method of claim 16, wherein one or more other stems also being played simultaneously are likewise modulated into an appropriate key.

18. The method of claim 16, wherein one or more other stems also being played simultaneously are temporarily muted to avoid playing stems in different keys simultaneously.

19. The method of claim 11, wherein the stem's tempo is also accelerated or decelerated before output.

20. The method of claim 11, wherein one or more other stems that were previously playing are silenced at the moment that the modified stem begins playing.

* * * * *